United States Patent

[11] 3,630,384

| [72] | Inventor | Haruhiko Toda |
| | | Mihara-shi, Japan |
| [21] | Appl. No. | 864,844 |
| [22] | Filed | Oct. 8, 1969 |
| [45] | Patented | Dec. 28, 1971 |
| [73] | Assignee | Teijin Limited |
| | | Osaka, Japan |
| [32] | Priority | Oct. 24, 1968 |
| [33] | | Japan |
| [31] | | 43/77474 |

[54] FILTER BED ELEMENT FOR USE IN MELT-SPINNING
8 Claims, 3 Drawing Figs.

[52] U.S. Cl.......................................... 210/506, 156/242
[51] Int. Cl.......................................... B01d 39/00

[50] Field of Search............................ 156/242; 210/496, 504, 506, 510

[56] References Cited
UNITED STATES PATENTS

| 2,077,512 | 4/1937 | Buchloh .................. | 210/504 |
| 2,266,363 | 12/1941 | Graves ................... | 210/496 X |
| 3,044,628 | 7/1962 | Heijnis .................. | 210/496 X |
| 3,071,808 | 1/1963 | MacKinnon ............. | 210/188 X |

*Primary Examiner*—Reuben Friedman
*Assistant Examiner*—R. W. Burks
*Attorneys*—Richard A. Anderson and Roy H. Massengill

ABSTRACT: A filter bed element for use in melt-spinning, which consists of a filter sand which has previously been molded using as a binder a synthetic high polymer having a melting point equal to or lower than that of the synthetic high polymer to be filtered.

PATENTED DEC28 1971 3,630,384

INVENTOR.
Haruhiko Toda
BY
ATTORNEY

FILTER BED ELEMENT FOR USE IN MELT-SPINNING

BACKGROUND OF THE INVENTION

The present invention relates to a filter bed element adapted to be provided in a spinning apparatus for the melt-spinning of synthetic fibers.

In the melt-spinning of spinning of synthetic fibers, it has been known to pass a polymer through a filter bed immediately before the melt-extrusion for the purpose of removing the foreign materials or decomposition products present in said polymer therefrom in a step prior to melt-spinning.

In the past, a filter sand, a metal screen or a sintered metal has normally been used as the filter bed in a melt-spinning apparatus but these filter elements were not entirely satisfactory in respect of filtering effect, ease of operation and economy. Particularly, the ease of working with such conventional filter beds during preparation of the bed is not necessarily satisfactory. For instance, a considerably high degree of skill is required for measuring a filter sand of a given particle size in a predetermined amount and disposing the filter sand in a filtering device uniformly to form a filter bed. Furthermore, it is impossible to completely prevent the filter sand from scattering during formation of the filter bed.

Attempts have heretofore been made to improve the workability as described in Japanese Pat. publication No. 20955/65, etc. but there has been a problem in attaining uniformity of the filter bed between the peripheral portion and the central portion thereof.

SUMMARY

The present invention is the method and article of manufacture comprising a filter bed formed with a filter bed element which has previously been molded of a filter sand of known particle size using as a binder a synthetic high polymer, the melting point of which is lower than that of a synthetic high polymer to be filtered. According to the present invention, the filter sand can be distributed uniformly at any portion of the filter bed and, therefore, the filtering uniformity can be markedly improved.

The synthetic high polymer to be used in the molding of the filter bed element may be the same as the synthetic high polymer to be filtered but is preferably one which is lower in melting point than the latter and which is chemically not reactive with the latter.

The synthetic high polymer to be used in the molding of the filter bed element may be the same as the synthetic high polymer to be filtered but is preferably one which is lower in melting point than the latter and which is chemically not reactive with the latter.

The synthetic high polymer adapted for use in the molding of the filter bed element is preferably a homopolymer, such as polyethylene, polypropylene, polybutene or the like, but may be a copolymer of said homopolymers.

Alternatively, a low molecular substance, such as paraffin, having a melting point higher than room temperature may advantageously be used as a binder in molding the filter sand in respect of molding workability but use of such substance is not completely satisfactory in respect of the hardness of the molded product of filter sand and in the other respects. In this view, use of a synthetic high polymer is still desirable.

The primary object of the present invention is to provide for the formation of such filter bed in a spinning apparatus uniformly easily.

Another object of the present invention is to prevent the filter bed from becoming nonuniform as a result of displacement of said filter bed during transportation, preheating and mounting in a spinning apparatus of said filter bed after assembly of a filtering device.

A further object is to make it possible to select the structure of the filter bed easily with respect to thickness and particle size.

BRIEF EXPLANATION OF DRAWINGS

The accompanying drawings show embodiments of the filter bed element for use in a melt-spinning according to the present invention, in which.

DESCRIPTION OF THE PREFERRED EMBODIMENTS

Figure 1:
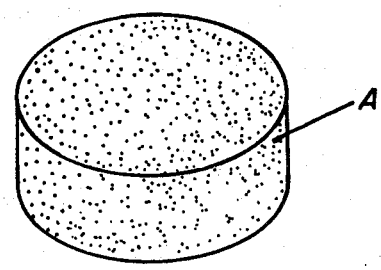
FIG. 1 is a view of a filter bed element consisting of a single layer of filter sand of the same particle size.

FIG. 1 shows a filter bed element consisting of a filter sand of the same particle size A molded into a single layer.

Figure 2:
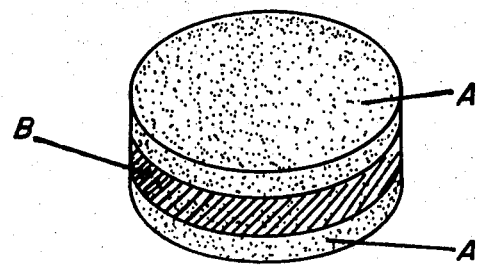
FIG. 2 is a view of a filter bed element consisting of three layers formed using filter sands of two different particle sizes.

FIG. 2 shows a filter bed element consisting of filter sands of two different particle sizes A and B molded into layers of different thicknesses and varying structural arrangement.

Figure 3:
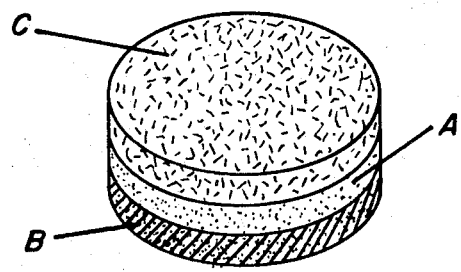
FIG. 3 is a view of a filter bed element consisting of three layers formed using filter sands of three different particle sizes.

FIG. 3 shows a filter bed element consisting of filter sands of three different particle sizes A and B and C molded into three layers of the same thickness.

EXAMPLE

Poly- -caprolactam having a limiting viscosity ( ) of 1.45 as measured in m-cresol at 25 C., and molten at 260 C., was passed through a filter bed element in the process of extrusion, which filter bed element had been molded of a filter sand using polyethylene as a binder. The results are shown in the table below:

| Filter bed | Performance | | | |
| --- | --- | --- | --- | --- |
| | Ratio of polymer leakage percent | Ratio of unsatisfactory dischagre, percent | Acceptance ratio of products, percent | Service life, hrs. |
| Conventional filter bed | 4 | 3 | 93 | 200–250 |
| Present filter bed | 0 | 1 | 98 | 500–800 |

As described above, according to the present invention a filter bed is provided by a filter bed element which has previously been produced by molding a filter sand in an optional thickness, using as a binder a synthetic high polymer having a melting point equal to or lower than that of a synthetic high polymer to be filtered. Therefore, a filter bed can be formed in a spinning apparatus readily and uniformly without the possibility of displacement of the filter bed, which would otherwise be caused during transportation, preheating and mounting in the spinning apparatus of the filter bed subsequent to the assembly of a filtering device. Accordingly, the filter bed is prevented from becoming nonuniform. Furthermore, since the binder is dissolved in the process of melt-spinning, a filtering capacity the same as that of the conventional filter bed can be obtained.

The method of this invention for preparing a filter bed comprises simply forming the filter sand to be used to the shape of the filter bed, then binding the same with the binding synthetic high polymer, then placing the molded filter bed in the apparatus for melting, and finally filtering the synthetic high polymer to be filtered through the molded bed. In the final step, binder is dissolved or flushed out of the filter bed, leaving only the filter sand.

I claim:

1. A molded filter bed element for use in melt-spinning comprising filter sand and a binder, said binder being a synthetic high polymer having a melting point lower than that of the synthetic high polymer to be filtered.

2. The filter bed element of claim 1 wherein the synthetic high polymer binder is selected from the group consisting of polyethylene, polypropylene, and polybutene.

3. The filter bed of claim 2 wherein the synthetic high polymer binder is polyethylene.

4. The method of preparing a filter bed element for use in melt-spinning comprising, in consecutive order:
   a. forming filter sand to the shape of the filter bed, and
   b. binding said formed filter sand with a synthetic high polymer having a melting point lower than that of the synthetic high polymer to be filtered, to form a molded filter bed.

5. The method of claim 4 wherein said filter bed element is then positioned in melt-spinning apparatus.

6. The method of claim 5 wherein said synthetic high polymer used as binding is dissolved by filtering said synthetic high polymer to be filtered.

7. The method of claim 4 wherein the synthetic high polymer binder is selected from the group consisting of polyethylene, polypropylene, and polybutene.

8. The method of claim 7 wherein the synthetic high polymer binder is polyethylene.